United States Patent [19]
Cole et al.

[11] Patent Number: 5,517,303
[45] Date of Patent: May 14, 1996

[54] COHERENCE SELECTIVE SENSOR SYSTEM

[75] Inventors: James H. Cole, Great Falls; Daniel F. Mathus, Vienna, both of Va.

[73] Assignee: Dylor Corporation, Ligonier, Pa.

[21] Appl. No.: 27,799

[22] Filed: Mar. 8, 1993

[51] Int. Cl.$^6$ ........................................ G01B 9/02
[52] U.S. Cl. ................ 356/345; 356/358; 250/227.19
[58] Field of Search ............................ 356/345, 357, 356/358, 351; 250/227.19, 227.21

[56] References Cited

U.S. PATENT DOCUMENTS

| | | | |
|---|---|---|---|
| 4,767,164 | 8/1988 | Yeung | 303/91 |
| 5,094,534 | 3/1992 | Cole et al. | 356/345 |
| 5,271,030 | 12/1993 | Chinen | 372/96 |
| 5,323,229 | 6/1994 | May et al. | 356/357 |

OTHER PUBLICATIONS

Appl. Phys. Lett. 41(7), Oct. 1, 1982, "Passive Stabilization Scheme for Fiber Interferometers Using (3×3) Fiber Directional Couplers", Koo, et. al., 616–618.
Applied Optics, vol. 22, No. 15, "Synchronous Phase Detection For Optical Fiber Interferometric Sensors", Jeffrey Bush et al., pp. 2329–2336.
Journal of Lightwave Technology, vol. LT-3, Oct. 1985, "Coherence Multiplexing of Fiber–Optic Interferometric Sensors", J. L. Brooks et al., 1062–1072.
Optics Letters, vol. 13, No. 8, Aug. 1988, "Short–Coherence–Length and High–Coupling–Efficiency Pulsed Diode Laser for Fiber–Optic Sensors", Wei–Kuo Chen et al., pp. 828–830.
"Multilayer Piezeoelectric Actuators", product flier, pp. 4–5.
NSG America, Inc., "SELFOC Micro Lens Options", p. 14.

United Technologies Photonics, Preliminary Data Sheet, "High Frequency Intensity Modulators", 8 pages.
"Modulator Frequency . . . ", Order sheet.
GEC–Marconi Materials Technology, Advanced Product Infor. Issue 3 Dec. 1992, "GaAs Modulator 1540 nm LC 1376".
GEC–Marconi Materials Technology, Product Information, "GaAs Modulator 1310nm LC 1375".
Crystal Technology, "OGW Phase Modulators With Fiber Optic Pigtails For High–Speed Phase Modulation of Light".
Crystal Technology, "OGW Phase Modulators For High–Speed Modulation of Light".

*Primary Examiner*—Rolf Hille
*Assistant Examiner*—David B. Hardy
*Attorney, Agent, or Firm*—Kerkam, Stowell, Kondracki & Clarke; Edward J. Kondracki

[57] ABSTRACT

A fiber optic interferometric sensor system utilizing a reference transducer and an optical source having a short coherence length in comparison to the optical transit time through the sensor. The optical source is used to interrogate a remotely located fiber optics sensor which has an optical path difference between two reflecting surfaces or between one reflecting surface and a beam transmitted through the sensor such that the optical beams are incoherent for the optical source used. The reflected and transmitted beams are then coupled to a reference transducer, located remotely from the sensor and preferably near the electronic processing circuitry. The reference transducer is designed with an optical path length difference to produce a coherent combination for the optical path length differences of both the sensor and the reference transducer thereby forming a highly sensitive interferometer.

91 Claims, 9 Drawing Sheets

COHERENCE SELECTIVE SENSOR SYSTEM

FIELD OF THE INVENTION

The present invention relates to optical communication systems and to optical interferometric sensor systems and more particularly to systems utilizing a transmissive reference transducer, polarization dependent sensors, and optical sources which have short coherence lengths.

BACKGROUND OF THE INVENTION

Fiber optic sensors can be used for many sensing applications. This includes automotive, medical security and industrial processing. Fiber optic interferometric sensors can provide the highest performance of any fiber optic sensor, however, fiber optic interferometric sensors require electronic processing to convert the optical information inscribed in the sensor to a linear electrical output. Thus, electronic circuitry is associated with fiber optic interferometric sensors. Fiber optic sensors are considerably more attractive for sensing applications when the sensor can be remotely deployed with the electronic processing and the reference transducer separated and removed from the sensor. One approach has been coherence multiplexing of fiber optic interferometric sensors with highly coherent sources as described by Brooks et al., "Coherent Multiplexing of Fiber-Optic Interferometric Sensors." IEEE Journal of Lightwave Technology, Vol. LT-3, No. 5 at page 1062, (October 1985). Large coherence lengths (4.5 m), however, are not compatible with small sensor designs. Moreover, these highly coherent sources are typically single mode or quasi-single mode laser diodes.

This specification will describe a system which combines these desirable features:

a fiber optic interferometric sensor system which utilizes short or very small coherence lengths (on the order of 10 microns to 10 centimeters) where the reference transducer and the electronic processing circuits are located remotely from the sensor.

A Coherence Selective Fiber Optic Interferometric Sensor System has numerous advantages as described in U.S. Pat. No. 5,094,534. That patent describes the utility of coherence selective sensors using an acoustic sensor as an example. The present disclosure provides a detailed description of an electric field sensor/converter for use in antenna remoting applications and also provides several improvements to the '534 patent. The improvements include the use of a sensor or transducer which requires a preferred polarization orientation, the use of a transmissive sensor and the use of a transmissive reference transducer. Also described is a transmitter-receiver configuration incorporated into the Coherence Selective Fiber Optic Interferometric Sensor System.

The present invention describes, in detail, specific system implementations and applications for a coherence selective fiber optic interferometric sensor system which provide for employing optical sensors for communications applications, lower optical loss through the use of transmissive sensors and reference transducers, and the use of polarization dependent sensors. A Passive Antenna Remoting System (PARS) employing a coherence selective electric field sensor/electric field converter is used as an example of these system implementations.

Currently deployed conventional microwave communication antennas are usually located in rugged terrain on mountains where services such as air conditioning as required for electronic processing equipment are at a premium. The high loss of coaxial cable often means that power must be provided along the transmission line to power amplifiers. Maintenance is also required at the antenna site and along the transmission line. These disadvantages are so great that microwave transmissions are often down converted to intermediate frequencies before transmission. Additional equipment is required at the antenna site in order to down convert. Therefore, it is desirable to use a low loss fiber optic transmission line to achieve long transmission distances without loss of signal or frequency down conversion. Currently fiber optic remoting of microwave antennas is accomplished by connecting (via an optical fiber) a fiber optic transmitter at a remote antenna site with a receiver located at a communication analysis site, such as described in U.S. Pat. No. 5,042,086. In a sensor-based antenna remoting system as discussed in this disclosure, a fiber optic transmitter at the antenna site is replaced by a passive fiber optic sensor. Ideally, no electrical power is required at the antenna/sensor location. In practice, however, some power is required to operate microwave or RF preamplifiers. No power is required at the antenna to power any optical component.

The coherent selective sensor disclosed has several advantages over conventional fiber optic transmission systems. Fiber optic transmitters require optical sources such as lasers. Lasers function best at lower temperatures and are often incompatible with the operational environment at the antenna. Like conventional coaxial cable transmission, an environmentally controlled shed at the antenna site would be required. In the coherent selective sensor system disclosed herein, an integrated optics modulator inscribes the information received by the antenna directly onto the light passing through the modulator. No electrical power other than the electrical signal to be transmitted is required by the modulator. The light source for the modulator is collocated with the optical receiver at an information processing center. Since personnel operate the processing centers, the environmental conditions are benign in comparison to those at the antenna site. Thus, the disclosed system may have may applications where a standard fiber optic transmission system would not be possible.

Integrated optic modulators are considered to be temperature sensitive. The operating point of the modulators do in fact vary with temperature. In the disclosed configuration where the modulator is located at the antenna, any change in the modulator operating point is compensated at the information processing center with the reference transducer.

Conventional fiber optic transmission systems whether using direct modulation of the laser source or external modulation, amplitude modulate light and pass that amplitude information over the optical fiber. Amplitude in this sense includes 1 and 0 which allows digital transmission. The coherence selective sensor systems disclosed herein offer the additional advantage that the information is phase modulated and the two incoherent signals with the relative phase modulation inscribed are transmitted over the same fiber. Due to the incoherence of the signal and the phase modulation, no information is encoded as amplitude variations, thus providing a level of security. A reference transducer which matches the time delay generated between the two signals at the modulator is required to recover the information. The transmission of both incoherent signals over the same transmission line results in common mode cancellation of any noise or perturbation applied to the fiber transmission line. This includes common mode cancellation of fiber dispersion.

The common mode cancellation of fiber dispersion is extremely important, in that singlemode lasers are typically used for long transmission distances, to over come dispersion. Singlemode lasers suffer from the fact that Stimulated Brillouin Scattering (SBS) limits the maximum optical power which a fiber can transmit and that the onset of SBS is lower as the linewidth is narrowed. The common mode cancellation of dispersion allows the use of lower cost multimode, broadband of multi-line lasers for long transmission distances. Significantly more optical power can be launched into the fiber, and therefore longer transmission distances without a repeater can be achieved. Even multimode fibers of standard or specialized designs may be used for high frequency information since the larger dispersion experienced with multimode fibers is common to both signals. The use of multimode fibers also allows for greater optical powers to be transmitted since the area of the optical fiber over which the light propagates is larger.

The following is an example of one possible application of the disclosed system; a new microwave antenna is to be installed 10 kilometers out of town. A microwave low noise amplifier and an electric field converter is connected to the antenna and mounted directly exposed to the environment without the necessity of building an antenna shed. Other than the power needed to drive the RF preamplifier (which due to the low power requirements can be driven remotely over small conductor included in the fiber cable), no additional power is required. Both the transmitter and receiver are located at the information processing center, such as a Cable TV Headend. No repeaters, down converters or other equipment is required between the antenna and the processing center. All high value and repairable equipment is located in the center where operators function on a daily basis. If transmitted signals are analog in nature, dynamic ranges of between 140 and 160 dB in a 1 Hertz bandwidth can be maintained. The upper limit will improve as new components become available.

A second application of the disclosed system is a replacement for conventional transmitter receiver systems. This configuration is called STARS for Secure Transmit and Receive System. Many applications, such as building-to-building transmission, do not have environment requirements of antenna remoting. In this case, the security and common mode rejection advantages of the disclosed system can be maintained, but at lower cost. The integrated optics modulator is packaged with the laser source at the transmitter and other support electronics. Two optical signals are generated and propagated over a single fiber to a matching reference transducer and a receiver at the other end of the transmission line. Similar performance to that described above is available using this configuration.

Another application of the coherence selective sensor system is for vibration sensing. An optical or fiber optic device which senses optical path length induced by vibration can be mounted on power generators. The Electro Magnetic Interference in this environment limits the utility of conventional sensors for this application. The optical source, the receiver, and the associated electronics would all be located in a monitor and control facility which oversees the operation of the power plant. The remote monitoring of the electrical signals at a distant location provides uncorrupted data. When the vibration levels of an individual power generator increased, the generator could be scheduled for maintenance repair during off-peak hours.

The reduced size and power consumption of the fiber optic sensor provides for ease of deployment in a low-profile package. The power consumption of a sensor-based system at a remote location, as described herein, will always be substantially lower than that of a corresponding laser transmission system since the power required to drive the laser is in addition to that required to drive the microwave or RF preamplifiers and is equal or greater in magnitude than that required to drive microwave amplifiers.

Applications of this sensor configuration extend to fiber optic Transmission Systems including Local and Wide Area networks LAN's and WAN's. The current configuration for fiber optic based networks is based on locating an optical source at each computer. This results either in high cost or low performance. High performance such as long distance between network nodes can presently be achieved using high power lasers at each node. The performance is achieved at the expense of providing a high power laser at each node. In order to lower installation costs, low power LED's or other sources have typically been used. The result is that in spite of the low loss of optical fibers, the system performance is very poor with low cost optical sources. In almost every case, the modulation applied to the optical beam is readily available to anyone able to access the fiber and thus not provide any measure of security.

Low cost electric field modulators incorporated into the coherence selective sensor system would provide reduced costs at each network node. A single high performance optical source at a file server would provide probe light necessary to interrogate the sensors located at each node. Due to the incoherence of the return signals from the modulators at each node, a relatively secure network is practical. The high power laser source can be divided down using optical splitters to address many nodes.

SUMMARY OF THE INVENTION

Generally, the present invention provides an optical interferometric sensor system for measuring optical path variations induced on a small sensor or transducer. In one embodiment for use in antenna remoting applications, an electric field sensor operating into the several 10's or in the future even 100's of GigaHertz is possible. Clearly, any measured field such as acoustic, temperature, acceleration, etc., which can be coupled to a change in optical path can potentially be implemented in a coherence selective sensor. The sensor system measures signals over a large dynamic range while maintaining a high degree of linearity. The system converts information returned from the remotely deployed optical sensor to coherent information through the use of a local reference transducer. The local reference transducer allows for closed loop system operation.

The present invention utilizes a low coherent optical source (typically having a coherence length of between a few and 20,000 microns) to eliminate coherent recombination of the optical beams within very small, remotely deployed sensor packages. A reference transducer is incorporated into the system which, preferably, is located remotely from the sensor. The optical fiber length between the sensor and the electronics is limited only by the fiber loss, providing excellent remote operation. The reference transducer has an optical path length which is matched to that of the sensor, and in conjunction with the sensor forms a single coherent interferometric output. Electronic processing is done locally on the signal from the reference transducer providing improved fiber optic sensor system performance for measuring small changes in the optical propagation time induced on the sensor. The small size of the Coherence Selective Sensor coupled with the high sensitivity and remote operation, provides an ideal sensor for microwave antenna remoting. The present invention has a wide range of potential applications since it can be used with sensor transducers which convert a signal generated from almost any measured parameter. For example, it can be used with a sensor transducer which converts acceleration into displacement.

The present invention also enables closed loop servo processing to be used on the sensor system. With closed loop processing, it is possible to provide linearity of over 150 dB. The use of low coherence length sources in conjunction with a local reference transducer provide small sensors having a high sensitivity and large linear operation.

The present invention comprises a small fiber optic sensor which detects a variation in the optical propagation generated by electrical signals of interest applied to the integrated electro-optic modulator. The fiber optic electric field sensor/converter although small, has an optical path difference between two reflecting surfaces or between a reflected and transmitted beam or between two transmitted beams such that the optical beams are incoherent for the optical source utilized. Upon reflection of the source light from the two reflecting surfaces of the remotely located sensor, the two light beams travel backwards along the same fiber used by the source to illuminate the sensor. The two beams are then coupled to a reference transducer which is designed with an optical path length difference to produce or select, a coherent combination for the optical path differences of both the sensor and reference transducer. Neither the sensor nor the transducer produces a coherent output independently. Thus, a highly sensitive interferometer is formed, consisting of the combination of the local reference transducer and the remote sensor. The reference transducer provides the opportunity to locally control the interferometer in a closed loop manner ensuring optimal performance.

Other details, objects and advantages of the present invention will become more readily apparent from the following description of a preferred embodiment thereof.

BRIEF DESCRIPTION OF THE DRAWINGS

In the accompanying drawings, a preferred embodiment of the present invention is illustrated, by way of example only, wherein.

DETAILED DESCRIPTION OF THE PREFERRED EMBODIMENT

Figure 1:
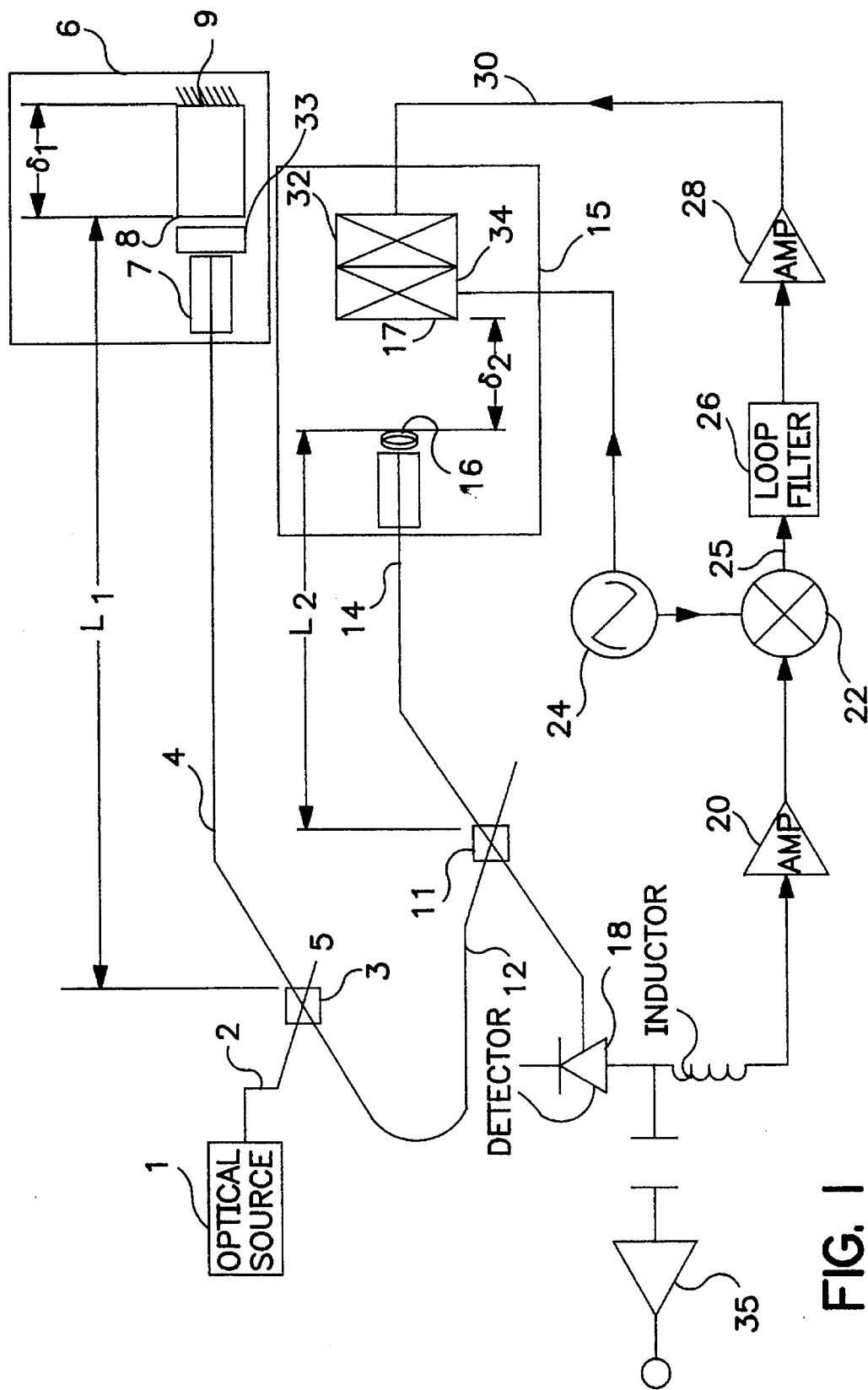
FIG. 1 is a block diagram of a fiber optic sensor system of the present invention.

As shown in FIG. 1, an optical source 1 provides light to a single mode fiber 2 that is coupled to a first fiber coupler 3 which acts as a fiber directional power splitter. Fiber coupler 3 splits the light and directs it into two output fibers 4 and 5. The light directed into fiber 5 from coupler 3 is not used in the embodiment as shown in FIG. 1, but it could be used for monitoring purposes. Alternatively, as will be discussed below with reference to FIG. 4, the output can be used in connection with a photodetector. The light from the upper port of coupler 3 is directed into the fiber 4 and propagates along fiber 4 an arbitrary length $L_1$ limited only by the loss of the fiber to a remotely located fiber optic electric field sensor/converter 6.

Figure 2A:
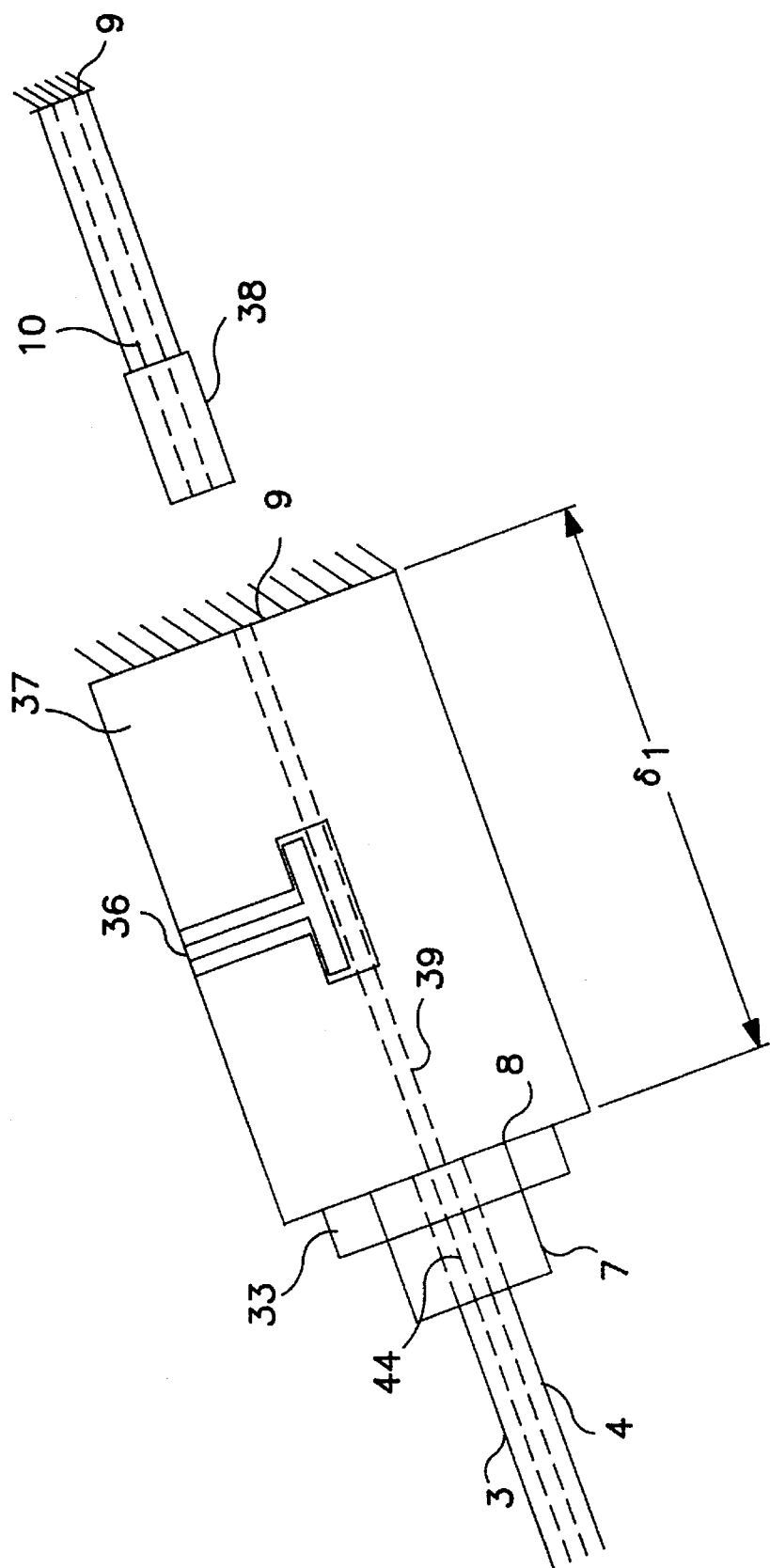
FIG. 2 shows a fiber optic electric field sensor/converter for use in the system of the present invention.

The electric field converter 6 may be constructed as shown in FIG. 2 by mounting the fiber 4 in a glass capillary 7 and polishing the combined fiber and capillary flat, or at an angle. Depending on the converter, capillaries of varying outside diameter can be used. The typical diameters are between 1 and 2 mm. A partially reflective surface 8 is optically coated with, for example, a dielectric coating to create the partial reflection. This partially reflective surface produces the first optical signal reflected from the converter back along the fiber 4. The capillary mounted fiber is aligned to an integrated optics modulator such that light is coupled from the waveguide in the fiber to the waveguide in an integrated optics modulator such as those manufactured by AT&T, GEC Marconi or Crystal Technology Incorporated (CTI). The modulator may be polarization independent such as the one manufactured by CTI or the input light may consist of equal amounts of orthogonal polarizations such that at least ½ of the light coupled into the integrated optics waveguide 39 is modulated. An electrical signal can be applied to electrode 36 which through the electro-optic effect phase modulates the light passing through the waveguide 39. A polarization selective element 33 shown in FIG. 1, such as a coating, or fiber polarizer such as those manufactured by York Technology could be used to filter out the unmodulated polarization component of the light. After propagating through the integrated optics modulator, a highly reflecting coating 9 is applied to the end of the modulator. The highly reflecting coating 9 could be dielectric or metal and is separated from the partially reflective surface 8 by a distance $\delta_1$. Alternately, the highly reflective coating may be mounted to an external fiber 10 which may then be attached to a second capillary holding the fiber.

The alignment of the fiber and integrated optics modulator is such that a reflection from the totally reflective coating provides the second reflection along fiber 4 for the electro optical converter. The distance $\delta_1$ between the two reflective surfaces of the converter can either be the length of the modulator, or can be adjusted by changing the location of the partial or high reflector relative to the modulator surfaces. In one embodiment, the relative position between the partial reflector and the mirror is approximately equal to half of the difference in length traveled by a first and second signal repropagated from the sensor.

Figure 2B:
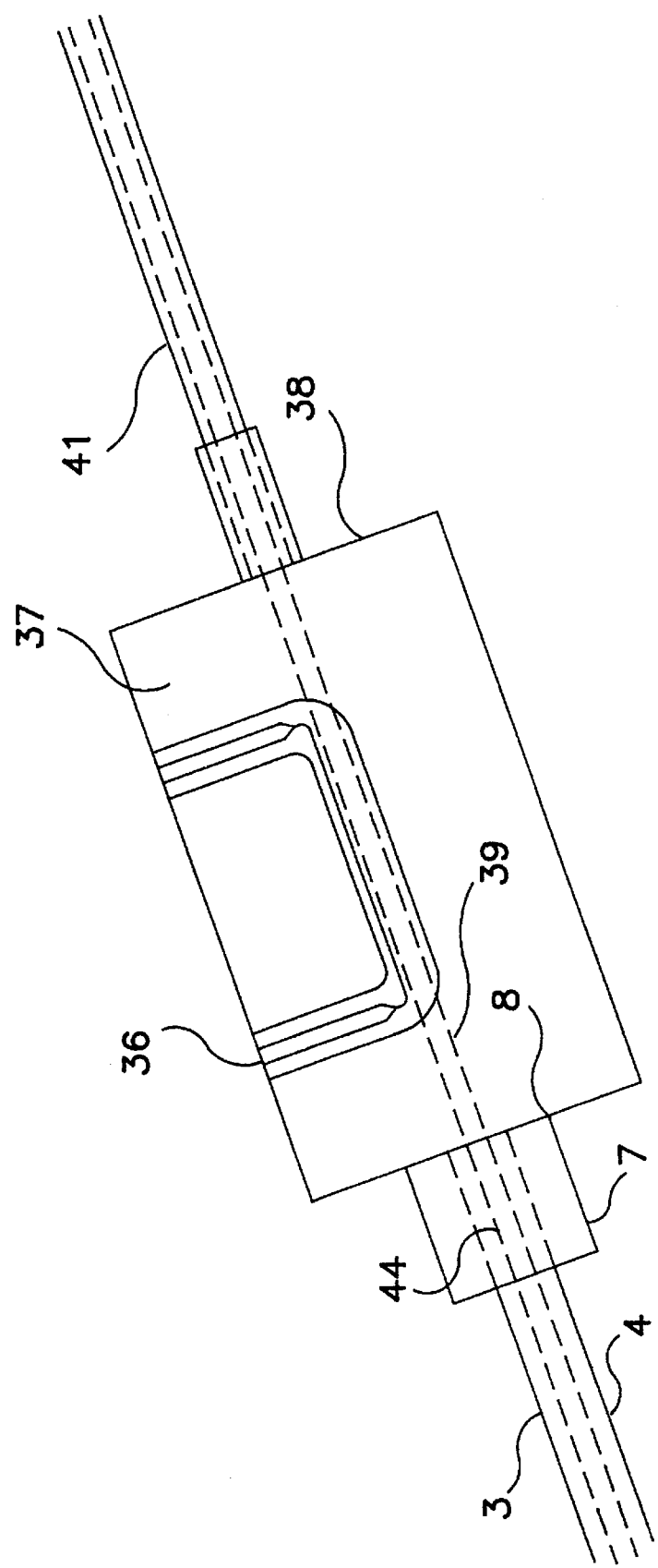

The light transmitted through the partial reflective surface travels a short distance $\delta_1$, the distance between the partially reflective surface 8 and the totally reflective surface 9. Neither of these incoherent beams have any amplitude information. A matching reference transducer is required to recover the information. Thus providing secure information transfer and low probability of detection. It is a consequence of these two reflections which both traverse the same transmission line fiber, that any effect along the fiber which are experienced by both beams are cancelled. Only modulation induced in the short sensor path is preserved. This produces two guided waves propagating in the reverse direction in fiber 4 towards the coupler 11 by a connecting fiber 12. The fiber length between couplers 3 and 11 is usually of the order of 1 meter; however, the length of the fiber connecting the two couplers is limited only by the loss of the fiber 12. Light from the coupler 11 is propagated down a fiber 14 to a reference transducer 15. The fiber 14 may be of any arbitrary length $L_2$ which is limited only by the loss of the fiber. As with the remote electric field converter 6, this reference transducer 15 is provided with a partially reflecting surface 16 which reflects part of the light back along fiber 14. Light is also transmitted across a distance $\delta_2$ and a sufficient portion is reflected back by a highly reflective surface 17. These reflected light waves are also reverse propagated in the fiber 14 to the coupler 11. As with the coupler 3, a portion of the light is transmitted back through the connector fiber 12 toward the source 1 through coupler 3. The remainder is made incident on a light detector 18 where it is converted to an electrical analog. The configuration thus described constitutes a four beam interferometer. FIG. 2b shows an alternate configuration which could be used for an optical beam transmitted through the modulator which could be coupled back to the input fiber through the use of a fiber optic coupler. In this case an electrode pattern depicting a traveling wave electrode has been used.

The four paths are described in Equation 1 (which ignore the common paths from the source 1 to coupler 3, coupler 3 to coupler 11, and coupler 11 to the detector 18):

$$\text{Path } 1 = 2L_1 + 2\delta_1 + L_2 + 2\delta_2$$

$$\text{Path } 2 = 2L_1 + L_2 + 2\delta_2 \quad (I)$$

$$\text{Path } 3 = 2L_1 + 2\delta_1 + L_2$$

$$\text{Path } 4 = 2L_1 + L_2$$

The light travelling through these four paths interfere, producing 6 interference terms of Equation 2 which are:

$$E_1^2 + E_2^2 + E_3^2 + E_4^2 + 2V_{12}E_1E_2\cos\{k(2\delta_1)\} + \quad (II)$$
$$2V_{13}E_1E_3\cos\{k(2\delta_2)\} +$$
$$2V_{14}E_1E_4\cos\{k(2\delta_1 + 2\delta_2)\} +$$
$$2V_{23}E_2E_3\cos\{k(2\delta_1 - 2\delta_2)\} +$$
$$2V_{24}E_2E_4\cos\{k(2\delta_2)\} +$$
$$2V_{34}E_3E_4\cos\{k(2\delta_1)\}$$

wherein:

$E_n$ = the electric field amplitude for path N
$V_{xy}$ = the visibility (correlation) coefficient for fields x and y
k = the free space wave number (k=2/λ)
λ = the wavelength of the optical source.

Inspection of the 6 interference terms shows that all the phase terms come from distances between the reflector in the electric field converter 6 and the transducer 15.

The ideal optical source 1 for this configuration is a white light source. This is a source which has a very short coherence length. If $\delta_1 = \delta_2$, and the white light source is used, then $V_{12} = V_{13} = V_{14} = V_{24} = V_{34} = 0$ and $V_{23}$ is approximately one. This greatly simplifies the six interference terms leaving only interference expression with a value, namely the fourth term. Rewriting the expression under these conditions results in Equation 3:

$$P_{DET} = E_1^2 + E_2^2 + E_3^2 + E_4^2 + 2E_2E_3\cos\{k(2\delta_1 - 2\delta_2)\} \quad (III)$$

The coherence selective sensor system configuration shown in FIG. 1 is one which allows the combination of a remote "all fiber" sensor and a local optical processor (including the reference transducer) to constitute a single interferometric entity. Both of the optical paths are present in the argument of the cosine term of Equation III. This means that any change in the path length of the sensor/converter or the reference transducer will change the phase of the interference signal. The reference path is adjusted to compensate for change in the path length of the sensor/converter, thus the reference transducer will change the phase of the interference signal. For example, the reference path is adjusted to maintain interferometric quadrature.

A principal advantage of the coherence selective sensor is that no coherent information is generated at the sensor/converter. Thus, no modulated information is present in the transmission fiber. The system thus provides additional security since tapping of the transmission fiber will not allow recovery of the information without a reference transducer. A low probability of intercept of the transmitted information is a feature of the system.

Figure 3A:
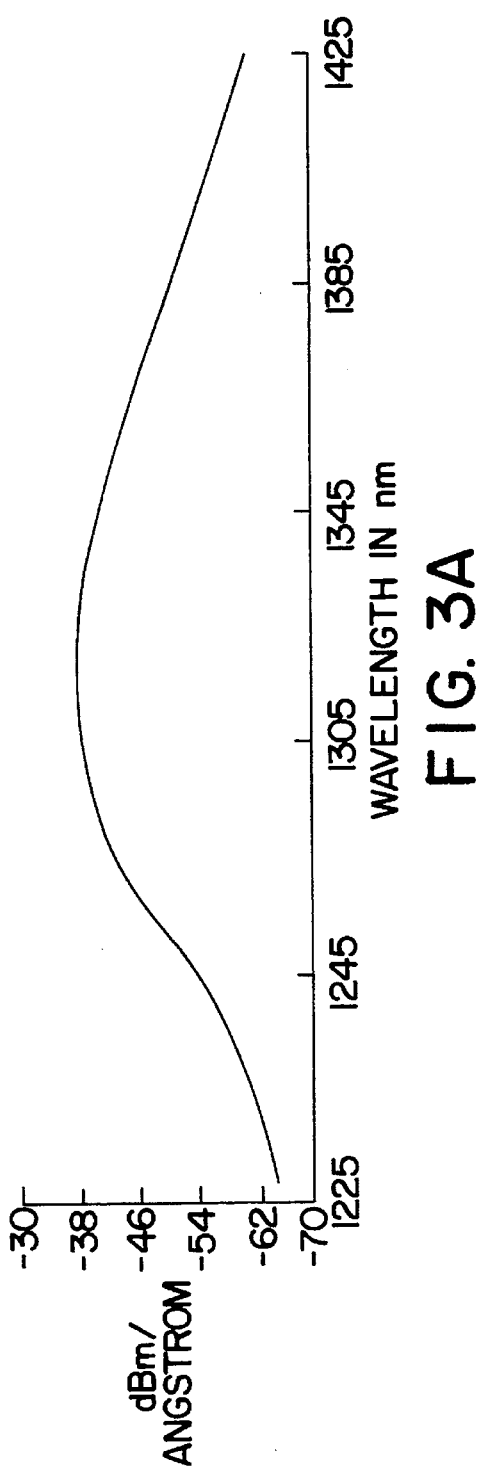
FIG. 3 shows plots of the optical spectrum and the coherence function of an optical source which can be used in the present invention.
Figure 3B:
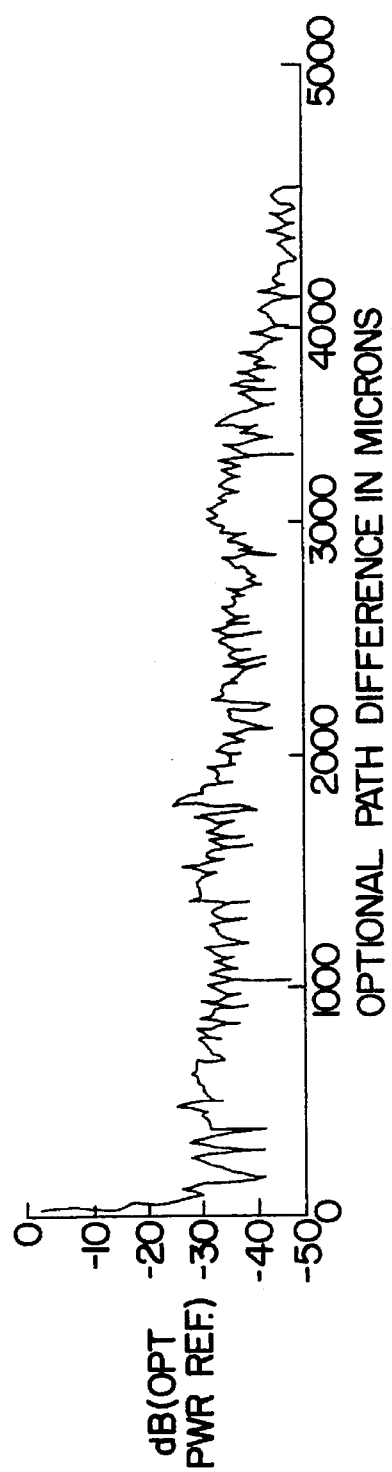

At present, there are no commercially available white light sources which can produce an ideal white light source having any appreciable power coupling into a single mode fiber. A device which closely resembles the spectral characteristics of a white light source, however, is a light emitting diode (LED). Most LEDs are surface emitting devices having emitting surfaces greater than 50 microns wide. These devices, however, do not couple much light into a single mode fiber. In recent years, however, an LED type device has been developed which overcomes the power coupling problem. It is called an edge light emitting diode (ELED). It has a very small emitting diameter, typically 2–4 microns. The spectrum and coherence (visibility) of an ELED device are shown in FIG. 3. This particular ELED device is manufactured by OKI and has a model number OE352G-010. When driven at 90 mA, it produces a power output at 25° C. of 1.50 micro-watts from the fiber pigtail. The peak power occurs around a wavelength of 1320 nm with power falling off by 30 dB (100X) for 100 nm wavelength variation in either direction. The normalized coherence or visibility function is shown below the spectrum in FIG. 3. It is plotted against optical path length difference in microns. If $2\delta_1$ and $2\delta_2$ for the optic sensor system of FIG. 1 are selected to be 120 microns or greater, and matched to within 15 microns of each other, then Equation III would be a valid equation because the visibility for the interference terms 1, 2, 3, 5 and 6 would be 0.001 or less and the visibility for term 4 would be close to 1. From this example, it can be seen that the ELED has clearly demonstrated that it is an excellent source for coherence selective sensors.

The preferred optical source which is capable of delivering more power than the ELED, but having similar characteristics, is the super luminescent diode (SLD). This type of optical source is constructed like a laser diode, but an optical absorber is built (processed) inbetween the two laser facets. This absorber defeats the round trip cavity gain enough to prevent lasing, but with the addition of the reflections of the back facet, the device becomes a "super-fluorescent" device, producing more output power than a standard ELED. SLD devices have the capability of delivering up to 350 microwatts into a single mode fiber. Some selected SLD devices can deliver over 500 micro-watts. These sources are also available from OKI, for example.

Figure 8:
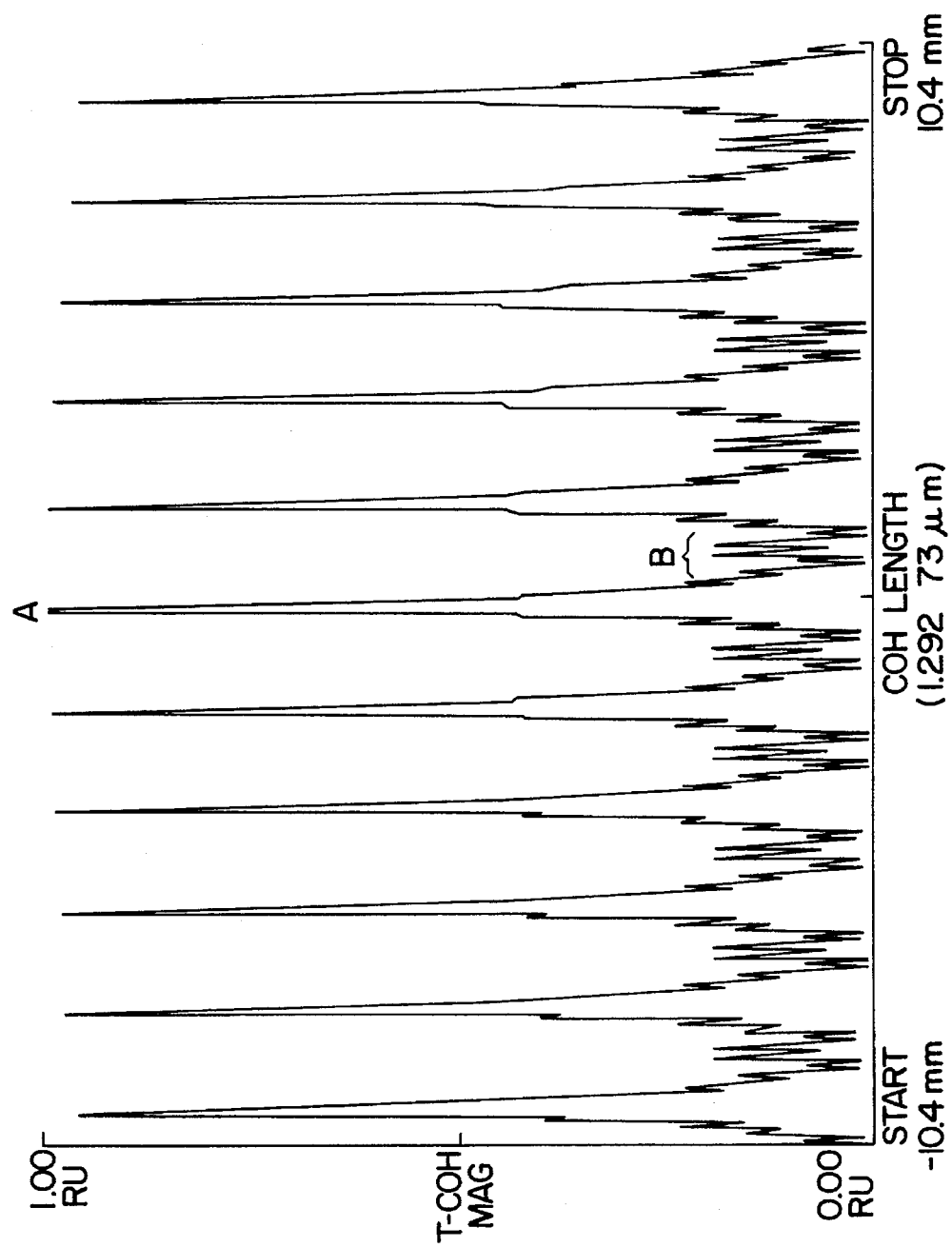
FIG. 8 shows a plot of the coherence function of a multimode laser which can be used as an optical source in the present invention.

The present invention also utilizes low coherence sources (i.e. ones having short coherence lengths) providing for small sensor size. These low coherence sources also exhibit low noise characteristics and thus provide a high sensitivity capability. For example, broadband sources operating at 1.3 micron wavelengths can demonstrate excellent performance. Multi-longitudinal line laser diodes which exhibit the proper coherence function and low relative intensity noise ($R_{in}$) can be used to obtain performance better than 2 microradians per root hertz. FIG. 8 contains a plot of the coherence function of a multi-longitudinal mode laser over a pathlength mismatch of approximately 1 centimeter. The envelope of the curve continues to drop as the pathlength is further mismatched, although that drop is not illustrated. Coherence selection can also be implemented between coherence peaks, for example, the distance 61 could be chosen to fall at any points such that coherence is minimized at the sensor/converter. That is $\delta_1$ is selected to match the distance between the points A and B on FIG. 8.

The pertinent optical parameters for the coherence selective sensor are the loss budget of the optical configuration, including fiber splices, connectors, components loss and the relative intensity noise ($R_{in}$) of the optical source. The optical loss budget for each of the four Paths listed in Equation (1) are approximated in Table 1. The reflections from surfaces 9 and 17 are 100%. The loss through the sensor between the optical mode for light being back-reflected from the sensor into the fiber and the propagating mode of that fiber is approximately 6 dB. The reference transducer has very low loss.

TABLE I

| Optical Loss Prediction for Four Optical Paths | | | | |
|---|---|---|---|---|
| | Path 1 | Path 2 | Path 3 | Path 4 |
| Cong. Power Split (double pass) | −12.0 | −12.0 | −12.0 | −12.0 |
| Reflections | −11.0 | −11.5 | −11.5 | −12.0 |
| Connector (double pass) | −2.0 | −2.0 | −2.0 | −2.0 |
| Coupler Loss (double pass) | −1.0 | −1.0 | −1.0 | −1.0 |

The four fiber optic splice locations will be between the optical source 1 and coupler 3, between coupler 3 and coupler 11, between coupler 11 and the reference transducer 15, and between coupler 11 and the detector 18. The splice between coupler 11 and the reference transducer 15 will be double passed, making a loss equivalent to 5 splices.

To more easily understand the optical parameters which determine system performance, the electronic servo system will be considered as a "noiseless" system. In practice, this is a good assumption when the quiescent optical level on the detector 18 is greater than one micro-watt. A well used measure for determining optical performance of an interferometric sensor is to describe the minimum detectable (dynamic or ac) phase shift normalized to a 1 hertz resolution (or noise equivalent) bandwidth. If we assume Equation III holds for the coherence selective sensor system, and an optical power can be specified for the pigtailed optical source, the minimum detectable phase shift for the optical system may be predicted. From Table 1, the background intensity is determined from the first four terms in Equation III. This intensity level can be identified as an equivalent loss term when referenced to the optical source. Taking the loss terms from Table 1, the equivalent loss (from source to detector) is determined to be 21.5 dB. Alternately, this means that the dc intensity level seen on the detector will be 0.071% of the source intensity. It is this quiescent level which produces the (assumed shot) noise floor of the system. In order to equate this noise to a phase shift, the full fringe intensity for the interfering terms needs to be calculated. From Equation III and Table 1, the intensity produced by a $\pi/2$ phase shift is approximated to be ½ that of the dc quiescent term. This would represent an equivalent loss (for the peak signal) of approximately 24.5 dB. If this number is scaled for an rms value, it becomes 26 dB loss. This is all the information required to determine the minimum detectable phase shift.

The minimum detectable phase is listed in Table 2 for sources ranging from 100 to 4000 micro-watts. The calculation was made by determining the shot noise created by the quiescent offset and taking the ratio of it to the signal produced by a $\pi/2$ interferometric phase shift. Since the interferometer is linearized by the servo, this optical signal represents one radian.

TABLE 2

| MINIMUM DETECTABLE PHASE | |
|---|---|
| Optical Power | (rms per root hz) |
| 100 μW | 2.8 μrad |
| 200 μW | 2.0 μrad |
| 300 μW | 1.6 μrad |
| 400 μW | 1.4 μrad |
| 500 μW | 1.3 μrad |
| 750 μW | 1.0 μrad |
| 1000 μW | 0.9 μrad |
| 2000 μW | 0.8 μrad |
| 4000 μW | 0.4 μrad |

Table 2 shows the expected square root dependence with the input optical power. It is interesting to note that if a multi-longitudinal line laser diode had the proper coherence nulls in its visibility function, it could produce a minimum detectable performance of less than 2 micro-radians. In order to do this, the laser diode would have to have a relative intensity noise measurement less than −120 dB. Performance equivalent to this level for micron wavelengths is available. See Chen et al., and "Short-coherence-length and high-coupling—efficiency pulsed diode laser for fiber optic sensors," Optical Letters, Vol. 13, No. 8 at page 628 (August 1988).

A servo system employed to maintain interferometric quadrature is shown in FIG. 1. The servo system guarantees that the interferometer will always be operating in its linear range. The optical signal generated from the interference described in Equation III, is detected as an amplitude signal on the detector 18, which is preferably a photodetector, and amplified by an amplifier 20. The signal is then multiplied in mixer 22 with the signal from a local oscillator 24. The base band signal 25 is filtered with loop filter 26 which optimizes the closed loop transfer function of the servo. The loop filter 26 also removes any signals or harmonics associated with the local oscillator frequency. The filtered signal may then be amplified by amplifier 28.

A dither signal is applied to the servo as a means to determine whether or not the interferometer is in quadrature. This dither signal has a frequency well above or below the frequency range of interest for the sensor, and is generally sinusoid. A complete discussion of this type of interferometric servo system can be found in Bush et al., "Synchronous phase Detection for optical fiber interferometric sensors", Applied Optics, Vol. 22, No. 15, at page 2329 (Aug. 1, 1983). If a linear reference transducer 15 is used in the servo, the voltage feedback signal 30 (to the reference transducer 15) will be linearly proportional to the entire phase of the interferometer. This feedback voltage will linearity track the sensor displacement (and optical phase) and is thus a replica of the desired signal.

An alternate approach to the interferometric servo system is to use open loop demodulation techniques. These techniques do not employ any feedback to the reference transducer to maintain a static phase operating point. In some cases, a dither signal would be applied to provide a pilot tone. In other cases, such as Passive Quadrature Demodulation, no signals are necessary. One such type of demodulation is disclosed in U.S. Pat. No. 4,436,425, which is incorporated herein by reference. A description of a passive demodulator is included in the publication, "Passive Stabilization Scheme for Fiber Interferometers Using (3×3) Fiber Directional couplers", by K. P. Koo, A. B. Tveten and A. Dandridge, Applied Physics Lett. 41, pp 616–618, (10-1982).

In the preferred embodiment, the transducer 15 consists of a mirror, attached to a piezoelectric actuator; for example, Tokin America NLA-2×3×9 and NLA 2×3×18. The physical construction of the transducer is similar to that of the sensor. The piezoelectric actuator 34 generates the optical dither signal while second device 32 provides the feedback element for the servo system. The advantage of using two actuators is that a smaller actuator with a higher resonant can be used for the dither signal while a large actuator with a larger displacement per volt can be used for the feedback loop. Although these devices are incorporated into the preferred embodiment, any phase modulating transducer element could be employed in any of the variant configurations. An alternate configuration would use a single piezoelectric actuator in place of the devices 34 and 32. In such a case, the signal from the local oscillator may be combined with the servo signal 30 in a summing amplifier with the combined signal fed back to the single piezoelectric actuator. Alternately, other types of reference transducers such as fiber wrapped PZT elements, integrated optics modulators, magneto-optic modulators, electro-optic modulators or others could be used by those knowledgeable in the state of the art.

Figure 4:
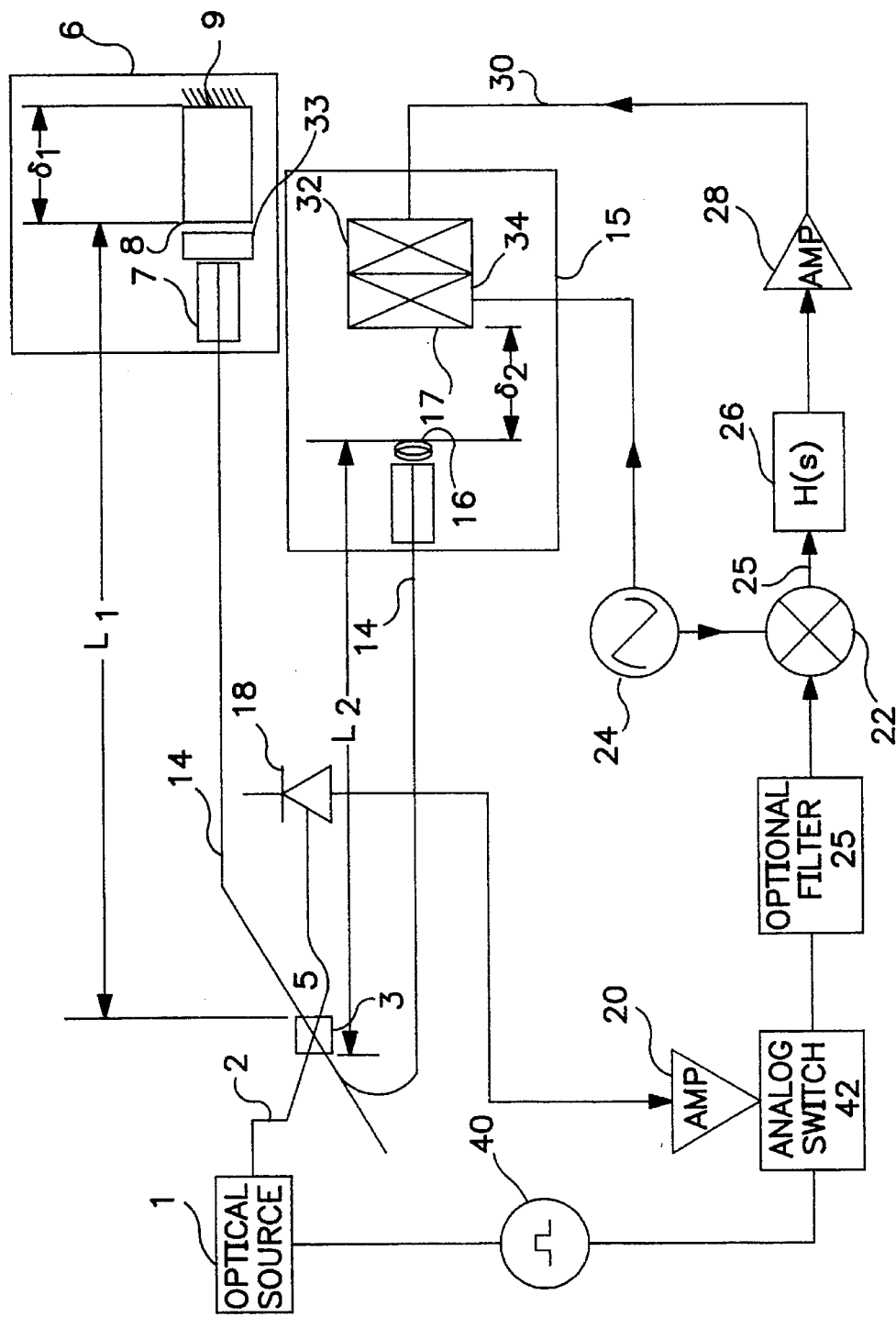
FIG. 4 shows a block diagram of a variant on the fiber optic sensor system of the invention.

An alternative configuration shown in FIG. 4 of the fiber optic interferometric sensor system consists of eliminating coupler 11. In this configuration, the fiber 14 extends from coupler 3 to the reference transducer 15. Detector 18 is connected to the end of fiber 5. In this configuration, for CW operation of the optical source 1, a large light level establishes a high noise floor on the detector 18 due to the direct coupling from the optical source 1 to the detector 18; thus reducing the signal to noise ratio.

The optical source is gated with pulse source 40 at approximately a 50 percent duty cycle. The frequency is chosen such that for the combined lengths $L_1$ and $L_2$, the return pulse from the sensor and transducer arrives at detector 18 at a different time than for the light directly coupled from the source 1. Although the signal out of the optical source is on only 50 percent of the time, the output of the detector is continuous. The received signal is then gated so that the detector output is only measured during the presence of the return signal of interest from the sensor and transducer. This is achieved with analog switch 42. The switch is only activated at the appropriate pulse arrival time. An optional filter can be used to filter out high frequency switching noise prior to the mixer. As an example, if the combined length of the fibers $L_1$ and $L_2$ are 20 meters greater than the direct path from the optical source, a 10 MHz modulation of the source and sampling rate would provide the correct output. This rate is easily achieved for commercially available optical sources. Longer lengths would require lower modulation frequencies. A start-up auto calibration is employed to adjust modulation frequency to correct value for a given sensor length. The peak output power of the optical source 1 can be higher under these conditions than for CW operation, as long as the average power remains constant. This configuration provides 3 dB lower loss than that of FIG. 1 due to the elimination of one trip through an optical coupler.

Figure 5:
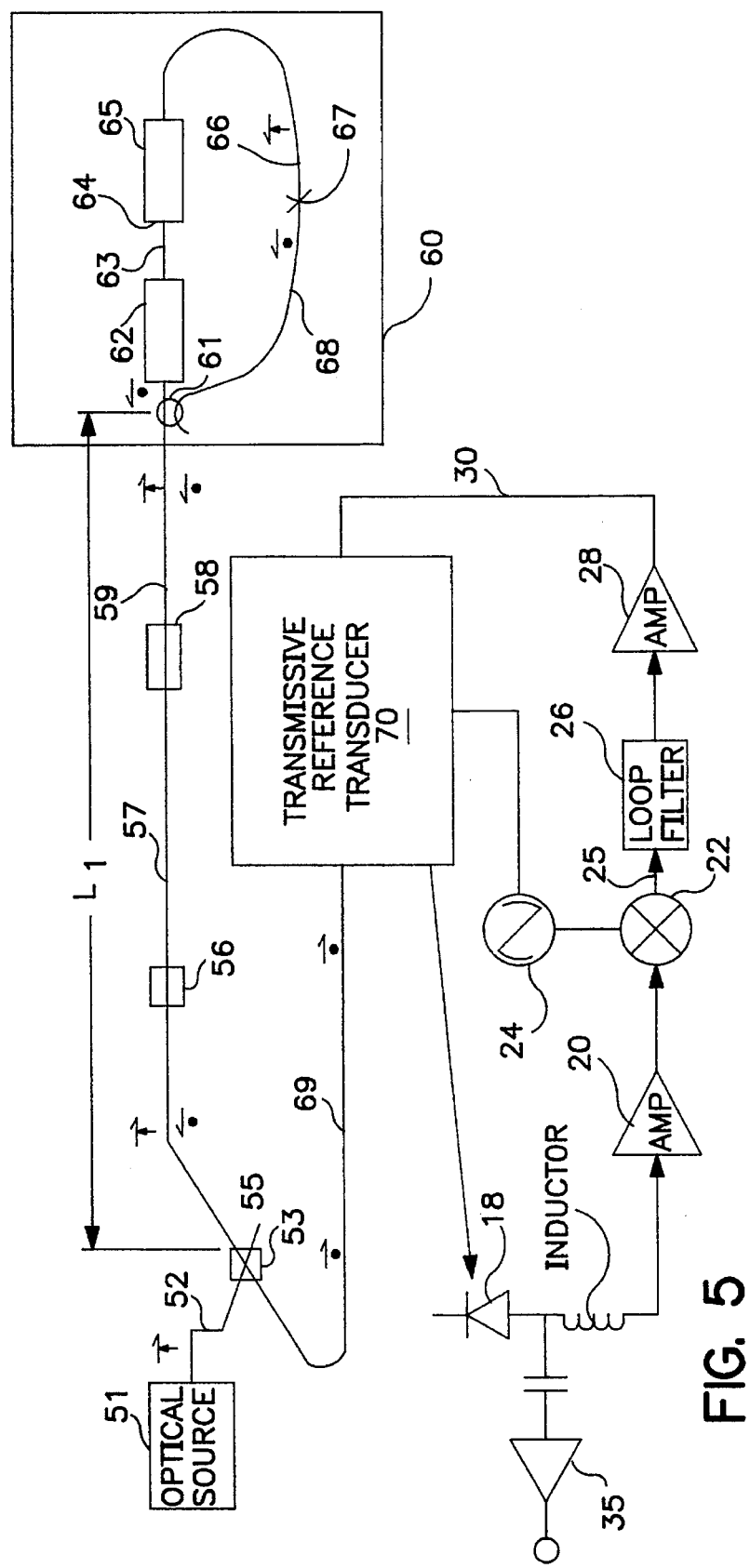
FIG. 5 is a block diagram of a variant on the fiber optic sensor system of FIG. 1 incorporating a polarization dependent sensor.
Figure 6:
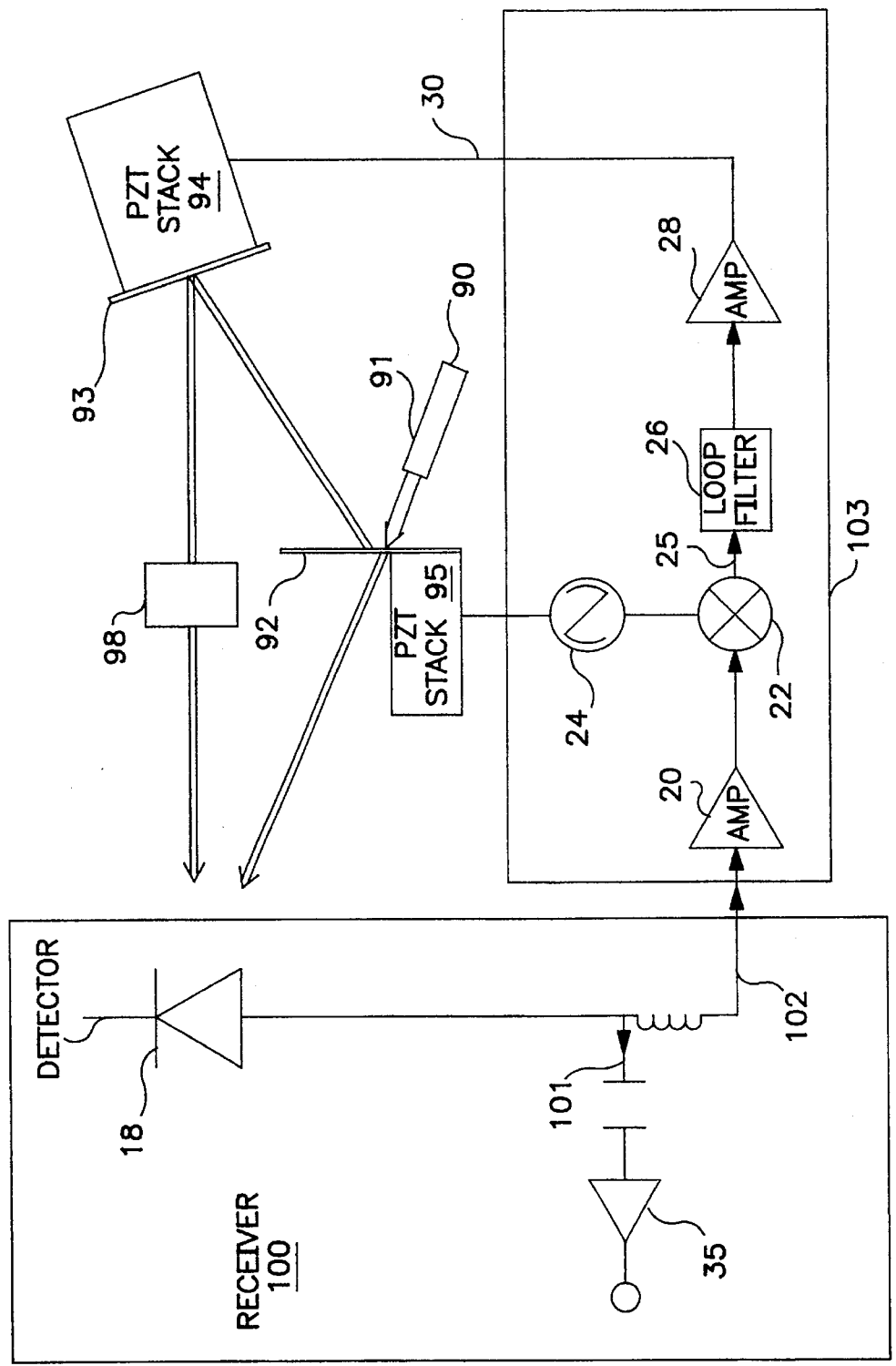
FIG. 6 shows a block diagram of a transmissive reference transducer for use in the sensor system of FIG. 5.

As shown in FIG. 5 an optical source 51 provides a probe beam of light from a linearly polarized high power laser for example, a low coherence semiconductor laser such as those made by Dylor Corporation (acts as a linearly polarized probe beam) and is coupled into Singlemode Polarization Maintaining Fiber pigtail 52, for example fiber made by York Technology Ltd. or Alcoa-Fujikura, and to a first polarization maintaining coupler 53, for example those made by Canadian Research and Instrumentation, such that essentially all the power from the fiber pigtail is transmitted outward from the laser. Vertical arrows indicate transverse electric field (TE) polarization while dots indicate Transverse Magnetic Field (TM) polarization. The small horizontal arrows over the TE arrow or TM dots indicate the propagation direction of the optical beam. The only reduction in power is due to excess losses of the fiber, the polarization maintaining coupler and the polarization extinction of the optical source. The state of polarization of the probe beam of light entering fiber coupler 53 is such that the majority of light, depending on the polarization extinction ratio of optical source, is transmitted through the fiber coupler 53 into polarization maintaining fiber 54 any light in the orthogonal polarization state is coupled into fiber 55. The light directed into fiber 55 from coupler 53 is not used in the embodiment as shown in FIG. 5, but it could be used for monitoring purposes. The probe beam passes through the polarization maintaining connector pair 56 and along the polarization maintaining fiber transmission line 57 (an alternative to using polarization maintaining fiber is to use a polarization controller) to the electric field converter polarization maintaining connector pair 58 and through polarization maintaining transmission line fiber 59 into the electric field converter 60. The electric field converter 60 consists of a polarization maintaining coupler 61, a non-reciprocal polarization rotator 62, a polarization maintaining fiber 63, a partial reflector 64, an integrated optics phase modulator 65 and a PMF pigtail 66. The polarization state throughout the system is aligned such that for example the TE probe beam passes through the polarization maintaining coupler 61 such that essentially all of the power which is in a single polarization state is coupled towards the non-reciprocal polarization rotator 62. The non-reciprocal polarization rotator can be implemented as a non-reciprocal optical isolator with polarizers removed, or at least with the input polarizer removed. Optical isolators are available from Optics for Research or Isowave. When the probe beam passes through the non-reciprocal polarization rotator 62, the output beam is linearly polarized at an angle of 45 degrees with respect to the input polarization. A partial reflector 64 fabricated using standard dielectric or metallic optical coatings is incorporated either into the fiber lead or onto the front face of the integrated optic phase modulator 65. The portion of the probe beam reflected from the partial reflector is coupled back through the non-reciprocal polarization rotator 62 and is rotated an additional 45 degrees relative to the input beam resulting in a total 90 degrees of polarization rotation thus coupling to the orthogonal polarization state. Since the light is now in the orthogonal polarization state, half is lost through coupling to the unused input port of polarization maintaining coupler 61. The preferred optical axis of the integrated optics phase modulator 65 is aligned to the output of the non-reciprocal polarization rotator (i.e. at 45° with respect to the TE polarization input into the polarization maintaining coupler 61) such that the maximum modulation efficiency of the modulator 65 is obtained. Two possible configurations of the integrated optic modulators can be utilized. For the highest frequency performance with optimum response, a RF traveling wave modulator can be utilized, for example, those produced by AT&T or United Technology Photonics. For lower frequency responses a lumped element phase modulator FIG. 2 can be used, for example, that made by Crystal Technology. In the case of a lumped element modulator, a high optical reflector coating onto either the end of the modulator, or onto a fiber pigtail will provide a high percentage optical reflection back through the modulator. The operation of a lumped element electrode modulator operating in the reflective mode has approximately a factor of 2 reduction in frequency response over the same configuration the light is transmitted through the modulator, but an increase in response by a factor of 2. In the preferred embodiment for either type of modulator, the output of the integrated optics modulator is pigtailed with polarization maintaining fiber 66 aligned to the axis of the modulator. The axis of the fiber is rotated 90 degrees relative to third port lead of the polarization maintaining coupler 61 and the two fibers are fused together such that half of the light transmitted through the modulator will be coupled back to the transmission line fiber 57 through the polarization maintaining connector 58. The other half of the light is lost since it is coupled to the unused input port of the polarization maintaining coupler 61. The return beam is then coupled through the polarization maintaining connector 56 to the polarization maintaining coupler 53. Because the polarization of both return light beams are rotated 90 degrees from the probe beam, essentially all the light is coupled to the transmissive reference transducer 70 minimizing the system optical loss. The transmissive reference transducer FIG. 6, consists of a polarization maintaining fiber 90 and a collimating lens 91, preferably anti-reflection coated to minimize optical losses. A lens (i.e., a Graded Refractive Index (GRIN) such as Selfoc® manufactured by Nippon Sheet Glass (NSG) or a conventional lens) is employed to collimate the beam exiting the fiber. The optical beam encounters a partial reflector 92. Part (approximately 50%) of the beam is transmitted while remainder of the beam is reflected to a mirror 93. The relative position between the partial reflector 92 and the mirror 93 is chosen to be nearly equal to half the difference in length traveled by the beam returned from the partial reflector 64 at the integrated optic modulator 65 and the beam transmitted through the integrated optics modulator 65 and returned. The relative position between the transmissive reference transducer partial reflector 92 and mirror 93 is then modulated with a Piezoelectric stacks 94 such as those manufactured by Tokin. The beam reflected from the mirror and the transmitted beam interfere onto the photodetector 18 of a receiver 100 which has the desired bandwidth of the information signal 101 and also provides a low frequency output 102 used to provide an input to the servo system 103. While a polarization rotator 98 is shown in the embodiment of FIG. 6, the rotator 98 is not used in the system of FIG. 5. The rotator is described in more detail below. The operation of the servo system is similar to those described above and in U.S. Pat. Nos. 5,042,086 and 5,094,534), the preferred embodiment of the servo 103 for high information bandwidth is to operate in quadrature when the phase relationship between the two optical beams are $(2n+1)\pi/2$, whereas for many low frequency applications the servo can also operate at $n\pi$ or any point between $(2n+1)\pi/2$ and $n\pi$. The output of the servo system 103 is connected to the Piezoelectric stack 94 of the transmissive reference transducer 70 and continually adjusts the stack 94 to ensure a quadrature phase relationship between the optical beams. The advantage of the variant illustrated in FIGS. 5 and 6 is that the use of polarization optical components reduces the optical loss listed in Table 1 as the configuration power split by 9 dB. This is almost an order of magnitude in optical power. The 9 dB increase in optical power is equivalent to factor of 7.94 increase. This corresponds to a reduction in the noise floors indicated in Table 2 by a factor of 3, or 10 dB in improved signal to noise.

Figure 7:
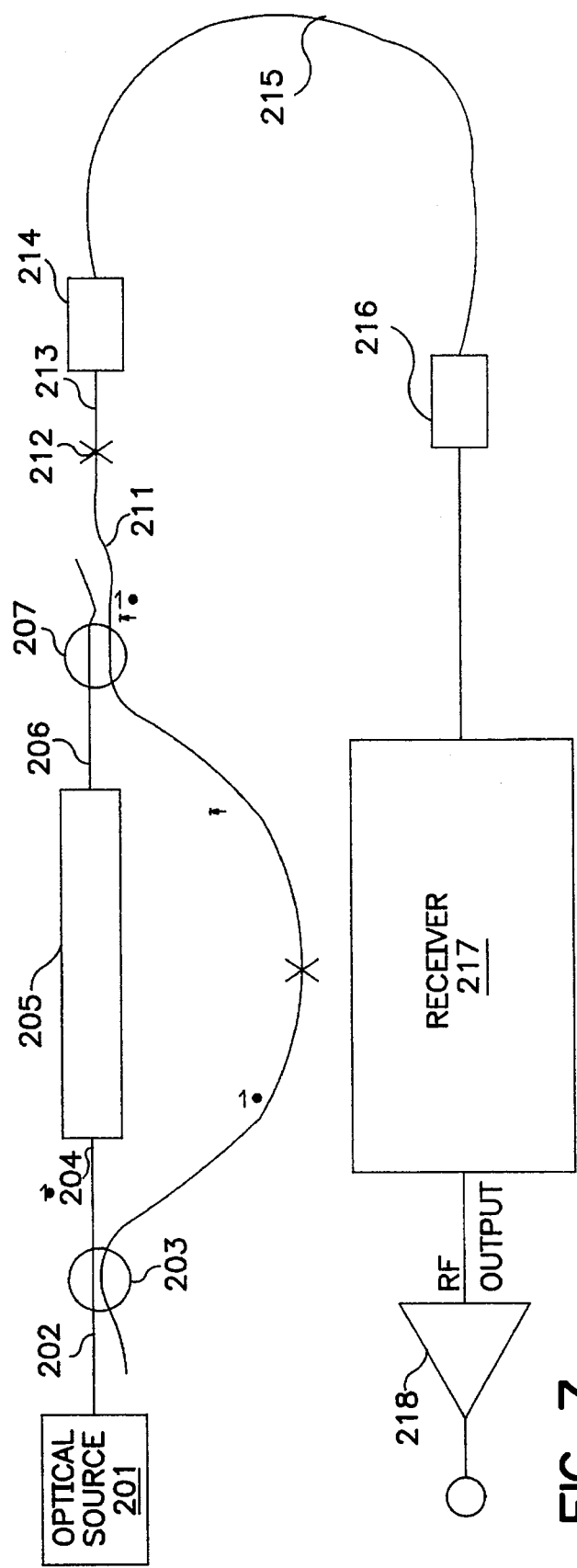
FIG. 7 shows a variant of the system which can be used as a transmission system.

An additional variant of the system is shown in FIG. 7, which demonstrates the utilization of a coherence selective system in a transmission or communications system. As shown in FIG. 7 an optical source 201 provides a probe beam of light from a linearly polarized high power laser for example, a low coherence semiconductor laser such as those made by Dylor Corporation (acts as a linearly polarized probe beam) and is coupled into Singlemode Polarization Maintaining Fiber pigtail 202, for example fiber made by York Technology Ltd. or Alcoa-Fujikura, and to a first polarization maintaining coupler 203 which splits the light, for example those made by Canadian Research and Instrumentation, such that essentially all the power from the fiber pigtail is transmitted outward from the laser. Vertical arrows indicate TE polarization while dots indicate TM polarization. The small horizontal arrows over the TE arrow or TM dots indicate the propagation direction of the optical beam. The only reduction in power is due to excess losses of the fiber, the polarization maintaining coupler and the polarization extinction of the optical source. The state of polarization of the probe beam of light entering fiber coupler 203 is such that a portion of the TM polarization state is coupled to the second output fiber 208 of coupler 203. The ratio can be chosen such that the input powers on fibers 206 and 210 to fiber coupler 207 are approximately equal. That ratio is determined primarily from the optical loss of the integrated optics modulator 205. The ratio can be altered to provide better performance by altering the ratio of light into fiber coupler 207. The fringe visibility of interferometer is only weakly dependent on the relative power levels of the two beams. Since the optical loss through the modulator is greater than through the fiber, a higher optical power can be obtained at the receiver by altering the power ratios of the two signals generated by the transmitter. The integrated optics modulator also has a maximum power limit which can be somewhat averted by coupling more of the optical power into the unmodulated signal. These advantages can also be applied to all of the configurations disclosed by altering the ratio of the two signals repropagated from the sensor or field converter. One beam passes through the polarization maintaining fiber 204 to the integrated optic modulator 205. The other beam passes through polarization maintaining fiber 208 to fiber fusion 209. The fiber at fusion 209 is rotated 90 degrees converting TM polarizations to TE with respect to polarization maintaining coupler 207. Polarization maintaining coupler 207 differs from 203 in that all of the TM is cross-coupled and no TE is coupled. Thus all the optical power from both fibers 206 and 210 are coupled to a single fiber output 211 of polarization maintaining coupler 207. Fiber 211 is fused at 212 to standard singlemode mode fiber 213 which is connected to fiber connector pair 214. Connector pair 214 is coupled to transmission line fiber 215 which can be of a length limited only by the optical loss and the corresponding system performance. At the end of the transmission line a second fiber connector pair 216 is coupled to a receiver 217. The receiver 217 includes a reference transducer as shown in FIG. 6 and described above. In this embodiment, the beam reflected from the mirror 93 may pass through a polarization rotator 98, here shown as a half-wave plate oriented such that the beam is rotated 90 degrees and so that both beams interfere on the photodetector 18 of the receiver 217. An optional RF amplifier 218 is also shown in FIG. 7.

It is clear to those knowledgeable in the field that many alternatives configurations exist. For example, if a lumped element integrated optics modulator were employed, the output end of the modulator, or and attached fiber could be coated with a high reflector and the systems described would operate with a slight (approximately 2X) reduction in the bandwidth of the modulator. Alternately, modulators with shorter electrodes could be used to achieve the same or higher bandwidth operating in a reflection mode.

Fiber mirrors could be used in place of conventional mirrors. The parts which comprise the system could be rearranged to produce alternate configurations. While a presently preferred embodiment of practicing the invention has been shown and described with particularity in connection with the accompanying drawings, the invention may otherwise be embodied within the scope of the following claims.

What is claimed is:

1. A fiber optic interferometric sensor system for sensing optical propagation variations, comprising:

an optical source, a remote optical sensor, a reference transducer, optical fiber means for interconnecting said sensor and reference transducer to form a single fiber optic interferometer, said sensor including first and second means for repropagating light received therein back through said optical fiber means towards said optical source, wherein said optical sensor has a pathlength difference between said first and said second repropagation means which is larger than the coherence length of said optical source, such that the repropagated light from said first and second repropagation means is substantially incoherent and said sensor is operable to sense optical propagation variations induced by index of refraction modulation, and further wherein said transducer includes third and fourth means for repropagating light received therein, said transducer having a pathlength between said third and fourth repropagation means which matches said sensor pathlength.

2. A fiber optic interferometric sensor system as defined in claim 1, and further including a detector and means for passing light from said interferometer to said detector.

3. A fiber optic interferometric sensor system as defined in claim 1, and further including a first coupler for passing light from said optical source to said optical fiber means.

4. A fiber optic interferometric sensor system as defined in claim 1, wherein said sensor is an electric field converter.

5. A fiber optic interferometric sensor system as defined in claim 4, wherein said electric field converter includes an integrated optics modulator, said optical fiber means being aligned with said modulator such that light from said source is coupled to a waveguide in said modulator.

6. A fiber optic interferometric sensor system as defined in claim 5, wherein said optical fiber means has an end adjacent said modulator mounted in a capillary.

7. A fiber optic interferometric sensor system as defined in claim 5, wherein said modulator is a polarization independent modulator.

8. A fiber optic interferometric sensor system as defined in claim 5, wherein said electric field converter includes polarization selective means mounted between said optical fiber means and said modulator for filtering out the unmodulated polarization component of the light from said source.

9. A fiber optic interferometric sensor system as defined in claim 5, wherein said modulator includes an electrode, said electrode being positioned between said partially reflective surface and said second means for repropagating light.

10. A fiber optic interferometric sensor system as defined in claim 9, wherein said electrode is operable, upon having an electric signal applied thereto, to phase modulate light passing through said waveguide in said modulator.

11. A fiber optic interferometric sensor system as defined in claim 9, wherein said second means for repropagating light includes a highly reflective surface which is operable to produce a reflected second optical signal back along said optical fiber means towards said source.

12. A fiber optic interferometric sensor system as defined in claim 11, wherein said highly reflective surface includes a highly reflective coating on an end of said modulator.

13. A fiber optic interferometric sensor system as defined in claim 11, wherein said second means for repropagating light includes a repropagation fiber mounted in a capillary externally of said modulator, said repropagation fiber including a highly reflective coating thereon.

14. A fiber optic interferometric sensor system as defined in claim 1, wherein said first means for repropagating light includes a partially reflective surface operable to produce a reflected first optical signal back along said optical fiber means towards said source.

15. A fiber optic interferometric sensor system as defined in claim 14, wherein said second repropagation means includes transmission means for transmitting light back through said optical fiber means.

16. A fiber optic interferometric sensor system as defined in claim 15, wherein said second repropagation means includes a modulator, a repropagation fiber and a fiber optic coupler, said repropagation fiber and said coupler being operable to couple light which passes through said modulator back into said optical fiber means, thereby producing a transmitted second optical signal back along said optical fiber means towards said source.

17. A fiber optic interferometric sensor system as defined in claim 1, wherein said first and second repropagation means are operable to produce a first and second optical signal, respectively, back along said optical fiber means towards said source, said first and second signals having no modulation information associated therewith when traveling through said optical fiber means between said sensor and said transducer, thereby providing secure information transfer and low probability of detection and interception.

18. A fiber optic interferometric sensor system as defined in claim 17, wherein said system is operable to cancel any common mode effects or noise along the optical fiber means which are experienced by both said first and said second signals.

19. A fiber optic interferometric sensor system as defined in claim 1, wherein said pathlength difference between said first and second repropagation means is operable to provide a first and second optical beam which is propagated over a single path such that said first and second optical beam experience the same dispersion, thereby causing said dispersion to be cancelled.

20. A fiber optic interferometric sensor system as defined in claim 19, wherein said optical fiber means includes multimode fiber.

21. A fiber optic interferometric sensor system as defined in claim 19, wherein said optical source is a multimode laser.

22. A fiber optic interferometric sensor system as defined in claim 19, wherein said optical source is a singlemode laser.

23. A fiber optic interferometric sensor system as defined in claim 19, wherein said optical source is a broadband source.

24. A fiber optic interferometric sensor system as defined in claim 19, wherein said optical fiber means includes singlemode fiber.

25. A fiber optic interferometric sensor system as defined in claim 24, wherein said optical source is a multimode laser.

26. A fiber optic interferometric sensor system as defined in claim 24, wherein said optical source is a broadband source.

27. A fiber optic interferometric sensor system as defined in claim 1, wherein said second repropagation means includes transmission means for transmitting light back through said optical fiber means.

28. A fiber optic interferometric sensor system as defined in claim 27, wherein said second repropagation means includes a modulator, a repropagation fiber and a fiber optic coupler, said repropagation fiber and said coupler being operable to couple light which passes through said modulator back into said optical fiber means, thereby producing a transmitted optical signal back along said optical fiber means towards said source.

29. A fiber optic interferometric sensor system as defined in claim 1, wherein said source has a short coherence length and said sensor has a pathlength difference between said first and second repropagation means which is within a coherence envelope of said optical source but is implemented between coherence peaks such that repropagated light is substantially incoherent.

30. A fiber optic interferometric sensor system as defined in claim 1, wherein a distance between said first and second repropagation means corresponds to points on a source coherence function over a pathlength mismatch such that coherence is minimized at said sensor.

31. The interferometric sensor system as described in claim 1, wherein said optical source comprises a light emitting diode and the distance between said first and second repropagation means and said third and fourth repropagation means are beyond the coherence length of said light emitting diode.

32. The interferometric sensor system as described in claim 1, wherein said optical source comprises a super luminescent diode and the distance between said first and second repropagation means and said third and fourth repropagation means are beyond the coherence length of said super luminescent diode.

33. The interferometric sensor system as described in claim 1, wherein said optical source comprises a multi-longitudinal line laser and the distance between said first and second repropagation means and said third and fourth repropagation means are beyond the coherence length of said multi-longitudinal line laser.

34. The interferometric sensor system as described in claim 1, wherein said optical source comprises a broadband source operating at approximately 1.3 micron wavelengths.

35. The interferometric sensor system as described in claim 1, wherein the distance between said first and said second repropagation means is between 10 microns and 20 centimeters.

36. The interferometric sensor system as described in claim 1, and further including a servo system which is operable to adjust said transducer and maintain linearity to a phase difference with respect to said sensor of $(2n+1)\pi/2$ radians, $n\pi$ radians or any angle therebetween.

37. The interferometric sensor system as defined in claim 36, wherein a piezoelectric actuator is used in the reference transducer and spaced to reflect light back into said optical fiber means, wherein said actuator is operatively connected with said servo system to be activated by a signal therein.

38. The interferometric sensor system as described in claim 37, wherein a dither signal is generated in said actuator.

39. The interferometric sensor system as described in claim 37, wherein the servo system comprises, in series, a first amplifier, a mixer, a loop filter, a second amplifier and a summer, the mixer having one input from the first amplifier and a second input from a local oscillator, and a summer having one input from the second amplifier and a second input from the local oscillator.

40. The interferometric sensor system as defined in claim 1, wherein said means for passing light to said detector includes a second coupler arranged in said optical fiber means.

41. The interferometric sensor system as defined in claim 1, wherein said system is operable to sense optical propagation variations induced by displacements.

42. A method of optically sensing dynamic displacements over a large dynamic range with high linearity comprising the steps of:

(a) using an optical source of low coherent light having a given polarization to generate optical signals non-coherent to small pathlength differences;

(b) propagating said low coherent light through a fiber optic to a remotely located fiber sensor;

(c) rotating the polarization of said low coherent light, producing a reflected light signal by reflecting a first portion of the light, rotating said first portion of the light, and producing a transmitted light signal by transmitting a second portion of the light through the sensor, such that the reflected light signal and the transmitted light signal are propagated back towards the source through the fiber optic, in a manner which provides a phase displacement without coherence between the reflected and transmitted light signals with information of interest; and (d) propagating phase displaced signals to a reference transducer and repropagating the phase displaced signals to produce a coherent interferometric optical signal by matching pathlength difference between repropagated signals from the transducer and the signals from the sensor to within an arbitrary difference of $(2n+1)\pi/2$ radians, $n\pi$ radians or any angle therebetween.

43. The method as defined in claim 42, further including detecting the interferometric optical signal and applying the interferometric optical signal to control the reference transducer.

44. The method as defined in claim 42, further including providing a dither signal back to said transducer for open loop demodulation of the interferometric optical signal.

45. The method as defined in claim 42, further including using a passive demodulation or stabilization scheme in conjunction with said transducer to recover the interferometric optical signal.

46. The method as defined in claim 42, wherein repropagating the signals in the reference transducer includes reflecting the signals once from a partially reflective optical member therein.

47. The method as defined in claim 46, wherein repropagating the signals in the reference transducer includes reflecting the signals once from a highly reflective optical member therein.

48. A fiber optic interferometric sensor system for sensing optical propagation variations over a large dynamic range with high linearity, comprising:

an optical source, a remote optical sensor, a reference transducer, optical fiber means for interconnecting said sensor and transducer to form a single fiber optic interferometer, a detector, a first coupler for passing light from said source to said optical fiber, means for passing light from said optic interferometer to said detector, and means for maintaining a polarization state of said light as said light propagates through said optical fiber means.

49. A fiber optic interferometric sensor system as defined in claim 48, wherein said source includes a polarized high power laser.

50. A fiber optic interferometric sensor system as defined in claim 49, wherein said polarized laser is a low coherence semiconductor laser.

51. A fiber optic interferometric sensor system as defined in claim 48, wherein said first coupler is a polarization maintaining coupler, the state of polarization of said light entering said first coupler being such that the majority of said light is coupled by said first coupler to a first polarization maintaining fiber.

52. A fiber optic interferometric sensor system as defined in claim 48, wherein said means for maintaining the polarization includes a polarization maintaining fiber.

53. A fiber optic interferometric sensor system as defined in claim 48, wherein said means for maintaining the polarization includes a polarization controller.

54. A fiber optic interferometric sensor system as defined in claim 48, wherein said means for maintaining the polarization includes a first polarization maintaining coupler, a first polarization maintaining fiber which passes light to a polarization maintaining transmission fiber, said transmission fiber being operable to pass light to a second polarization maintaining fiber which, in turn, passes light to said sensor.

55. A fiber optic interferometric sensor system as defined in claim 48, wherein said sensor is an electric field converter.

56. A fiber optic interferometric sensor system as defined in claim 48, wherein said sensor is a polarization sensitive sensor.

57. A fiber optic interferometric sensor system as defined in claim 56, wherein said sensor includes a non-reciprocal polarization rotator.

58. A fiber optic interferometric sensor system as defined in claim 57, wherein said sensor is an electric field sensor/converter.

59. A fiber optic interferometric sensor system as defined in claim 57, wherein said rotator is a non-reciprocal polarization isolator having at least one input polarizer thereof removed therefrom.

60. A fiber optic interferometric sensor system as defined in claim 57, wherein said rotator is operable to linearly polarize light passing therethrough at an angle of 45 degrees, said partial reflector being operable to reflect a portion of the output light from said rotator back through said rotator and through said optical fiber means, said rotator being operable to rotate said reflected light portion an additional 45 degrees, thereby resulting in a total 90 degrees of polarization rotation thus coupling said light portion to the orthogonal polarization state, and further wherein the unreflected light passes through said modulator and the output light from said modulator is pigtailed with a polarization maintaining fiber aligned to the axis of the modulator, said pigtailed fiber including means for rotating 90 degrees the polarization of the output light from said modulator and transmitting said output light back through said optical fiber means.

61. A fiber optic interferometric sensor system as defined in claim 56, wherein said sensor includes a sensor polarization maintaining coupler, a non-reciprocal polarization rotator, a partial reflector, and an integrated optics modulator, said sensor coupler, rotator and modulator being coupled together with polarization maintaining fiber.

62. A fiber optic interferometric sensor system as defined in claim 48, wherein said transducer is a transmissive reference transducer.

63. A fiber optic interferometric sensor system as defined in claim 62, wherein said transmissive reference transducer includes a collimating lens positioned to collimate the light received at the transducer from said optical fiber means, a partial reflector which is operable to reflect a first portion of the received light towards a mirror and transmit a second portion of the received light towards said detector, said mirror being operable to reflect said first portion of said light towards said detector.

64. A fiber optic interferometric sensor system as defined in claim 63, wherein the relative position between said partial reflector and said mirror is approximately equal to half of the difference in length traveled by a first and second signal repropagated from said sensor.

65. A fiber optic interferometric sensor system as defined in claim 63, wherein the relative position between said partial reflector and said mirror are modulated with piezoelectric stacks.

66. A fiber optic interferometric sensor system as defined in claim 65, wherein said transducer includes a polarization rotator which is operable to rotate 90 degrees the light reflected from said mirror.

67. A fiber optic interferometric sensor system as defined in claim 65, and further including a servo system which is operable to adjust said transducer, wherein said piezoelectric stacks are operatively connected with said servo system such that said stacks are actuated by a signal therefrom.

68. A fiber optic interferometric sensor system as defined in claim 63, wherein said transmitted light from said partial reflector and said reflected light from said mirror interfere onto said detector, said detector being operable to generate an output signal which is inputted to said servo system for controlling said transducer.

69. An optical sensor, comprising:
an optical coupler, an optics modulator, a first optical fiber interconnecting said coupler and said modulator, a partial reflector which is operable to reflect a portion of light coupled into said fiber back towards said coupler, and a second optical fiber which connects said modulator back to said coupler.

70. An optical sensor as defined in claim 69, further including a polarization rotator connected between said coupler and said modulator.

71. An optical sensor as defined in claim 70, wherein said polarization rotator is a non-reciprocal polarization rotator.

72. An optical sensor as defined in claim 70, wherein said rotator is operable to linearly polarize light passing therethrough at an angle of 45 degrees, said partial reflector being operable to reflect a portion of the output light from said rotator back through said rotator towards said coupler, said rotator being operable to rotate said reflected light portion an additional 45 degrees, thereby resulting in a total 90 degrees of polarization rotation thus coupling said light portion to the orthogonal polarization state, and further wherein the unreflected light passes through said modulator and the output light from said modulator is pigtailed with said second fiber which is aligned to the axis of the modulator, said second fiber including means for rotating 90 degrees the polarization of the output light from said modulator and transmitting said output light back to said coupler.

73. An optical sensor as defined in claim 69, wherein said partial reflector is a partially reflective coating located adjacent a first end of said modulator.

74. An optical sensor as defined in claim 69, wherein said coupler is a polarization maintaining coupler, and said first and second fibers are polarization maintaining fibers.

75. A fiber optic interferometric sensor system for use in transmission or communication systems, comprising:

an optical source which produces a probe beam of light, a first polarization maintaining coupler having first and second output fibers, said coupler being operable to split said probe beam into a first and second beam, said first output fiber being a polarization maintaining fiber which passes said first beam to an integrated optics phase modulator, said second output fiber including means for rotating the polarization of said second beam 90 degrees, a second polarization maintaining coupler which couples the output from said modulator and the rotated second beam to a single fiber, a first connector pair which couples said single fiber to a transmission line fiber, and a second connector pair which couples said transmission line fiber to a receiver.

76. A fiber optic interferometric sensor system as defined in claim 75, wherein said receiver includes a reference transducer.

77. A fiber optic interferometric sensor system as defined in claim 76, wherein said receiver includes an RF amplifier.

78. A fiber optic interferometric sensor system as defined in claim 75, wherein said receiver includes a transmissive reference transducer.

79. A fiber optic interferometric sensor system as defined in claim 77, wherein the amount of light split into said first and second beam is selected such that an AC signal produced thereby is maximized at said receiver.

80. A method of optically sensing optical propagation variations over a large dynamic range with high linearity comprising the steps of:

(a) using an optical source of low coherent light to generate linearly polarized optical signals non-coherent to small pathlength differences;

(b) propagating said low coherent light through a fiber optic to a remotely located fiber sensor;

(c) linearly polarizing said light by an angle of 45 degrees;

(d) reflecting a first portion of the light back towards said source and rotating said first light portion again by an angle of 45 degrees to produce a reflected signal, and transmitting a second portion of the light through the sensor and fiber coupler in a manner which rotates said transmitted light by 90 degrees and produces a transmitted signal, such that the reflected signal and the transmitted signal are propagated back towards the source through the fiber optic, in a manner which provides a phase displacement without coherence between the signals, said phase displacement containing information of interest; and (e) propagating the phase displaced signals to a reference transducer and repropagating the signals to produce a coherent interferometric optical signal by matching pathlength differences between the repropagated signals from the transducer and the reflected and transmitted signals from the sensor to within an arbitrary difference of $(2n+1)\pi/2$ radians, $n\pi$ radians or any angle therebetween.

81. The method as defined in claim 80, further including detecting the interferometric optical signal and applying the interferometric optical signal to control the transducer.

82. The method as defined in claim 80, further including providing a dither signal back to the transducer for open loop demodulation of the interferometric optical signal.

83. The method as defined in claim 80, further including using a passive demodulation scheme in conjunction with the transducer to recover the interferometric optical signal.

84. The method as defined in claim 80, further including using a passive stabilization scheme in conjunction with the transducer to recover the interferometric optical signal.

85. A method of optically transmitting information, comprising:

(a) using an optical source of low coherent light to generate a linearly polarized optical probe beam non-coherent to small pathlength differences;

(b) splitting said probe beam into first and second optical beams;

(c) passing said first beam through an integrated optics phase modulator wherein said phase modulator is operable to inscribe electrical information onto said first beam, and passing said second beam through an optical fiber, in a manner which provides a phase displacement without coherence between said first and second beams, said phase displacement containing information of interest;

(d) coupling said first and second beams into a common transmission fiber; and (e) propagating the phase displaced first and second beams to a receiver which includes a reference transducer operable to produce a coherent interferometric optical signal therefrom.

86. The method as defined in claim 85, and further including rotating the polarization of said second beam by 90 degrees while passing through said optical fiber.

87. The method as defined in claim 85, and further including selecting the ratio of light which is split into said first and second beams such that the AC signal produced thereby is maximized at the receiver.

88. The method as defined in claim 85, further including detecting the interferometric optical signal and applying the interferometric optical signal to control the transducer.

89. The method as defined in claim 85, further including providing a dither signal back to the transducer for open loop demodulation of the interferometric optical signal.

90. The method as defined in claim 85, further including using a passive demodulation scheme in conjunction with the transducer to recover the interferometric optical signal.

91. The method as defined in claim 85, further including using a passive stabilization scheme in conjunction with the transducer to recover the interferometric optical signal.

* * * * *

UNITED STATES PATENT AND TRADEMARK OFFICE
CERTIFICATE OF CORRECTION

PATENT NO. : 5,517,303
DATED : May 14, 1996
INVENTOR(S) : COLE et al.

It is certified that error appears in the above-indentified patent and that said Letters Patent is hereby corrected as shown below:

Col. 21, Line 32 (Claim 79, Line 2) "claim 77" should be -- claim 75 --.

Signed and Sealed this

Fifteenth Day of October, 1996

Attest:

BRUCE LEHMAN

Attesting Officer    Commissioner of Patents and Trademarks